United States Patent [19]

Rodgers

[11] 4,401,703

[45] Aug. 30, 1983

[54] ANTIFOULING TILE CONTAINING ANTIFOULANT RESERVOIRS FOR IN SITU REPLENISHMENT

[76] Inventor: Stephen D. Rodgers, 3005 Trinity Dr., Bowie, Md. 20715

[21] Appl. No.: 313,892

[22] Filed: Oct. 22, 1981

[51] Int. Cl.$^3$ .......... B32B 3/20

[52] U.S. Cl. .......... 428/72; 428/76; 428/44; 428/47; 428/166; 428/188; 428/907

[58] Field of Search .......... 428/907, 913, 45, 47, 428/72, 76, 117, 137, 138, 172, 166, 188, 48, 44; 424/19, 22; 106/16, 18.35; 260/429.7

[56] References Cited

U.S. PATENT DOCUMENTS 3,497,990 3/1970 Jeffries .......... 428/907 X 4,143,496 3/1979 Destito .......... 428/47 X 4,160,335 7/1979 Von Kohorn et al. .......... 428/907 X

*Primary Examiner*—Alexander S. Thomas

*Attorney, Agent, or Firm*—R. F. Beers; L. A. Marsh

[57] ABSTRACT

A modular antifouling tile is formed with a plurality of reservoirs that contain antifoulant which diffuses therefrom through the matrix of the coating. The coating matrix is preferably formed of an elastomeric material selected from the group of butyl and natural rubbers, neoprene, polybutylene, polyisoprene, polybutadiene, polysulfides, polyurethanes, vinyls, polyacrylonitriles, and copolymer blends thereof. Selected antifoulants that diffuse through a coating matrix of the abovementioned materials include tributyltin oxide and 2, 4, 5, 6-tetrachloroisophthalonitrile.

8 Claims, 10 Drawing Figures

ANTIFOULING TILE CONTAINING ANTIFOULANT RESERVOIRS FOR IN SITU REPLENISHMENT

BACKGROUND OF THE INVENTION

This invention generally relates to an antifouling system and, more particularly, to a modular arrangement of rubber tiles provided with a repetitive pattern of cells filled with compatible antifoulant materials which diffuse through the matrix of the rubber tile material.

Effective antifouling coatings include a means for transporting the antifouling materials to the boundary layer of the coating where fouling occurs. Mechanisms for transporting and releasing antifoulant include contact leaching and hydrolysis of the antifoulant; leaching of the antifoulant from a soluble matrix; and diffusion of antifoulant through the matrix. One problem encountered in utilizing the aforementioned release mechanisms is the difficulty of controlling the release rate of antifoulant from the coating. For example, too high of an antifoulant release rate has led to rapid exhaustion of antifoulant, and too low of a release rate often fails to adequately protect the coating surface from fouling. After a period of time, antifouling materials in coating matrixes become so diluted that the coatings lose antifouling effectiveness the coating must be replaced. The antifouling coating system of the present invention overcomes problems of the prior art by utilizing reservoirs that permit insitu replenishment of antifoulant.

In a diffusion type of coating, the antifoulant diffuses throughout the coating matrix. As the antifoulant material passes into the seawater from the boundary layer of the coating, the remaining antifouling material redistributes itself in an attempt to maintain equilibrium within the coating. If the diffusion or migration rate is suitably controlled it is possible to maintain an antifouling environment in which the release rate of antifoulant from the boundary layer of the coating is slightly greater than the threshold tolerance levels of the fouling organisms. One type of diffusion system utilized to control the rate of release and thereby provide a long service life involves the use two coating layers where the outer coating serves as a diffusion layer and the inner layer served as a reservoir for the surplus antifoulant. However, multi-coat systems are difficult to manufacture and properly apply to the ship hull, and the release rate is greatly affected by the thickness of the outer diffusion layer.

SUMMARY OF THE INVENTION

The antifouling coating of the present invention overcomes drawbacks with the prior art by utilizing a modular antifouling system in which the individual tile modules are provided with a plurality of reservoirs that contain antifoulant. The antifoulant migrates/diffuses from the reservoirs to the boundary layer of the tiles whereupon it precludes the attachment of fouling organisms thereto. Insitu replenishment of antifoulant in the reservoirs is accomplished by inserting a syringe device into a depleted reservoir or cell and injecting the antifoulant therein. Various types of identifying indicia and self-sealing plugs may be incorporated into the tiles to indicate the location and depleted condition of the antifouling cavities. The particular reservoirs or cavities in the tiles may be cellular, in which they are isolated from each other, or interconnected, in which passages extend between adjacent cavities.

The antifouling tiles are preferably constructed of elastomeric materials selected from the group of butyl rubber, neoprene (polychloroprene), natural rubber, polybutylene, polyisoprene, polybutadiene, polysulfide rubbers, polyurethanes, vinyls, polyacrylonitriles and copolymer blends thereof. One means for adjusting the diffusion rate of antifoulant through the abovementioned elastomer materials comprises blending selected resins into the elastomeric matrix. Preferred resins include polyvinyl chloride, polystyrene, chlorinated natural rubber, polypropylene and polyethylene. Selected antifoulant materials designed to diffuse through the elastomer-resin matrix include chlorinated cyano-benzene compounds and organotin compounds. Another means for controlling the diffusion rate of antifoulant through the elastomeric matrix comprises mixing selected antifoulants, such as organotin oxides or 2, 4, 5, 6-tetrachloroisophthalonitrile, with selected plasticizers, such as chlorinated aliphatic hydrocarbons.

Accordingly, an object of the present invention is to provide a diffusion type antifouling coating which has a controlled rate of release and a means of holding excess antifoulant.

Another object of this invention is the provision of a modular system of antifouling tiles which facilitates rapid, efficient replacement and repair of selected sections of the coating system.

A further object of the present invention is to provide a modular, long lasting antifouling coating having antifouling reservoirs formed therein to permit insitu replenishment of antifoulant and thereby avoid costly drydocking procedures required for other types of antifouling coatings.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in conjunction with the accompanying drawings, in which:

DETAILED DESCRIPTION OF THE INVENTION

Figure 1:
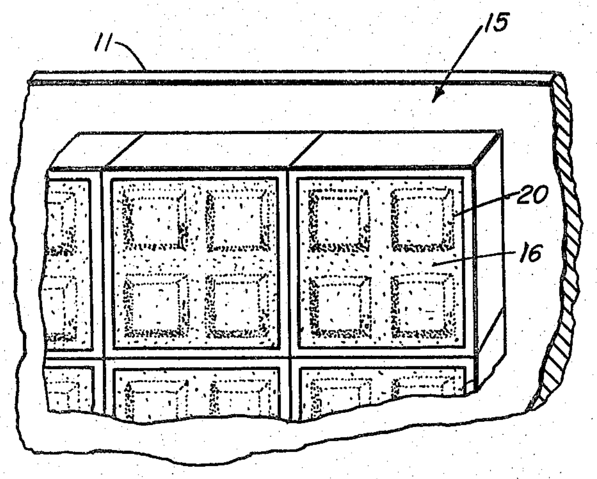
FIG. 1 is a view of a plurality of modular antifouling tiles secured to a hull surface.
Figure 2:
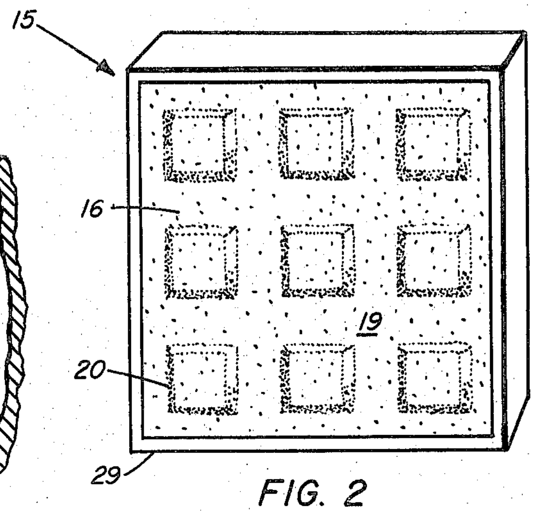
FIG. 2 is a perspective view of an antifouling tile having a plurality of facial indicia to indicate the location of the antifouling reservoirs.

Referring now to the drawings and to FIG. 1 in particular there is shown a plurality of modular antifouling tiles 15 secured to the hull surface 11 of a vessel. The antifouling tiles 15 are provided with a plurality of cellular cavities 22 or reservoirs which contain antifoulant 23 that diffuses therefrom into the matrix of the modular tile 15. Upon depletion of antifoulant material 23 in the reservoirs 22, insitu replacement thereof may be accomplished by inserting a syringe device into the reservoirs 22 and filling them with selected antifoulants 23. This not only eliminates the necessity of drydocking the ship to replace depleted antifouling coatings, as with conventional antifouling coating systems, but also reduces the potential contamination of the environment with debris associated with the removal and disposal of worn out antifouling coatings. The location of the reservoirs 22 by a diver can be determined by providing the surface 19 of the tiles with various indicia, such as protrusions 20 and/or grooves.

Figure 3A:
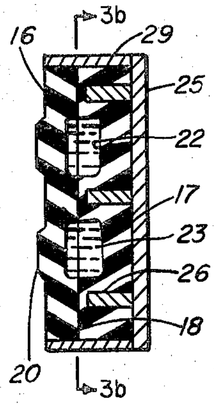
FIG. 3A is a sectional view of an antifouling tile provided with cellular antifouling reservoirs and a backing plate support structure.
Figure 3B:
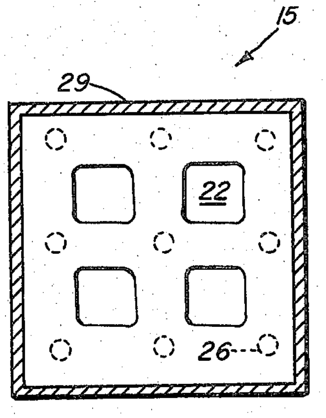
FIG. 3B is a frontal view of the antifouling tile of FIG. 3A taken generally along line 3—3.

The tiles 15 are preferably formed of composite sections that are bonded together to facilitate construction of the modular tiles and to improve the durability and structural integrity of the tiles 15. In FIGS. 3A, 3B, for example, the tiles 15 include a body section formed of two elastomeric sections 16, 17 that are bonded together along the interface 18. The outer section 16 is molded to provide protrusions 20 on the exposed surface 19 of the tiles 15 and corresponding depressions in the opposite interface surface 18. The inner section 17 is preferably formed by positioning a support plate 25, which is provided with a plurality of support pegs 26, into a mold and then molding the elastomer therearound to provide locking protrusions therein. The body section is then prepared by bonding the inner and outer sections together along the interface surface 18 so that antifoulant reservoirs 22 are formed of the corresponding recesses in the sections. A circumferential strip 29 of material is then applied to the periphery of the body section to provide additional reinforcement and preclude separation of the body sections along the interface surface 18. The support pegs 26 may be provided with enlarged distal end portions or other locking features to prevent separation of the inner section 17 from the support plate 25. The backing plates for the tile structures may be constructed of hard rubbers, plastic materials, and composite materials such as fiberglass. The inner and outer body sections 16, 17, as well as the circumferential strip 29, are constructed of selected rubbers and elastomeric materials.

Figure 4A:
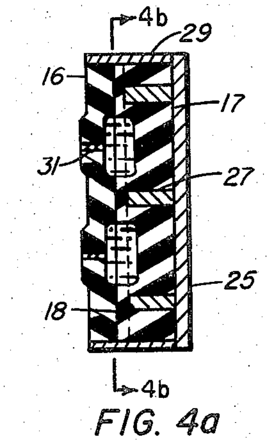
FIG. 4A is a sectional view of another antifouling tile provided with cellular antifouling reservoirs and a grid type backing plate support.
Figure 4B:
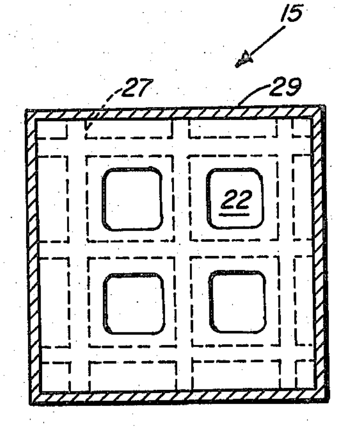
FIG. 4B is a frontal view of the antifouling tile of FIG. 4A taken generally along line 4—4.

The tile structure of FIGS. 4A, 4B are similar in construction to the tile structures of FIGS. 3A, 3B except that the outer section 16 is provided with valve means in the form of passages containing one-way valve elements 31 so that a syrings device can be inserted and withdrawn therefrom without loss of antifoulant therethrough. Also, a lattice type of reinforcing means 27 is utilized instead of the support pegs to provide additional support for the inner and outer elastomeric sections.

Figure 5A:
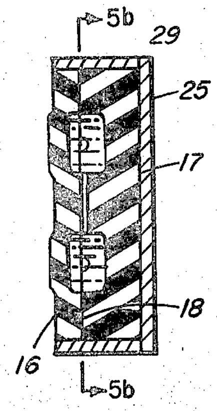
FIG. 5A is a sectional view of a further antifouling tile provided with interconnected antifouling reservoirs and a planar backing plate.
Figure 5B:
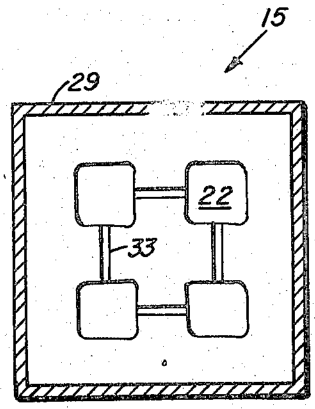
FIG. 5B is a frontal view of the antifouling tile of FIG. 5A taken generally along line 5—5.

The tile structure 15 of FIGS. 5A, 5B is provided with interconnecting passages 33 so that insitu replenishment of the reservoirs can be accomplished by selectively filling one of the reservoirs 22 with excess antifoulant 23 overflowing into the other reservoirs 22. For example, antifoulant can be injected into the lower reservoirs and "old" antifoulant can be simultaneously withdrawn from the upper reservoirs in FIGS. 5A, 5B. The backing plate 25 for the tile structure 15 is planar to enable the tile 15 to conform to curved surfaces of the ship hull.

Figure 6A:
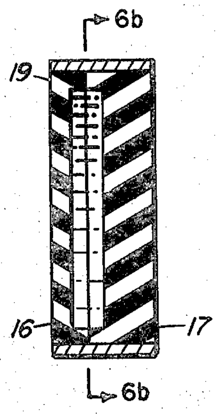
FIG. 6A is a sectional view of still another antifouling tile provided with interconnected elongated antifouling reservoirs.
Figure 6B:
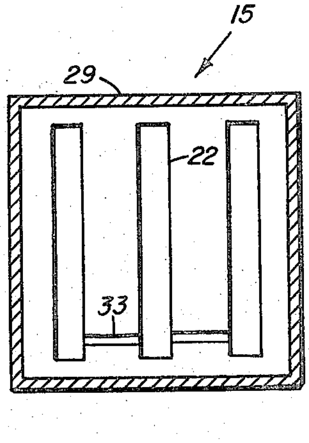
FIG. 6B is a frontal view of the antifouling tile of FIG. 6A taken generally along line 6—6.

The tile structure 15 of FIGS. 6A, 6B is similar in construction to the tile structure of FIGS. 5A, 5B except that the interconnected reservoirs 22 are elongated and no backing plate support is utilized.

The inner and outer body sections 16, 17 of the antifouling tiles 15 are preferably constructed of selected elastomers such as butyl rubber, neoprene (chloroprene), natural rubber, polybutylenes, polyisoprene, polybutadiene, polysulfide rubbers, polyurethanes, vinyls, polyacrylonitriles, polyisobutylene, and copolymer blends thereof. Since the outer section 16 serves as the primary diffusion layer, it can be constructed of a different elastomeric material than the inner elastomeric section 17. Thus, the outer layer 16 can be constructed of the abovementioned elastomeric materials and the inner layer 17 can be molded of a hard rubber to improve the strength characteristics of the tile 15.

One means for adjusting the diffusion rate of selected antifoulants 23 through the elastomeric matrix is to blend selected resins with the elastomeric materials during the molding process. Preferred resin materials include polyvinyl chloride, polystyrene, chlorinated natural rubber, polypropylene, and polyethylene. Selected antifoulant materials designed to diffuse through the elastomer-resin matrix include chlorinated cyanobenzene compounds such as 2, 4, 5, 6-tetrachloroisophtalonitrile, and organotin compounds, such a tributyltin oxide tributyltin fluoride, tripropyltin oxide, and tripropyltin fluoride. The molding process should be carried out by using elastomeric materials having a low glass transition temperature (below an ambient temperature range of 65° F. to 75° F.) and a resin material having a high glass transition temperature (above 75° F.).

Another means for adjusting the diffusion rate of selected antifoulant 23 through the elastomeric matrix is to combine the selected antifoulant with a plasticizer that is compatible with both the elastomer and the antifoulant. Selected antifoulants found compatible with the abovementioned groups of elastomeric materials include tributyltin oxide and 2,4,5, 6-tetrachloroisophtalonitrile. Compatible plasticizers include chlorinated aliphatic hydrocarbons such as chlorinated liquid paraffins (i.e. Chlorowax 40 manufactured by Diamond Shamrock Co.). The plasticizer, which like the antifoulant also passes into the water from the surface 19 of the antifouling tile 15, is mixed with the antifoulant in weight proportions which preferably range from about 1:1 to about 20:1 parts of plasticizer to parts of antifoulant.

Obviously many modifications and variations of the present invention are possible in the light of the above teachings. It is therefore to be understood that within the scope of the appended claims the invention may be practiced otherwise than as specifically described.

What is claimed is:

1. A modular antifouling tile system for precluding the attachment of fouling organisms to articles for use in seawater comprising:

antifouling tile modules having a plurality of reservoirs for containing antifoulant and the material forming the body portion constructed of elastomeric material selected from the group consisting of butyl rubber, neoprene (polychloroprene), natural rubber, polybutylenes, polyisoprene, polybutadiene, polysulfide rubbers, polyurethanes, vinyls, polyacrylonitriles, polyisobutylene, and copolymer blends thereof blended with a resin material selected from the group consisting of polyvinyl chlorides, polystyrene, chlorinated natural rubber, polypropylene, and polyethylene forming the elastomeric body portion of the overall matrix, said elastomeric material of the matrix having a glass transition temperature of below 65° F. and the resin material of the matrix having a glass transition temperature above 75° F., with the proviso that the reservoirs may be cellular, in which they are isolated from each other, or interconnected, in which passages extend between each reservoir, an antifoulant located in each reservoir selected from the group consisting of 2,4,5,6-tetrachloroisophtalonitrile, tributyltin fluoride, tripropyltin oxide, and tripropytin fluoride, an insitu antifoulant indicia and replenishment means located on the surface as a protrusion or groove if interconnected for determining the depleted condition of the module and replenishment thereof, attachment means for securing the antifouling tile modules to the article for use in seawater, and wherein the antifoulant is blended with a chlorinated aliphatic hydrocarbon plasticizer in weight proportions ranging from about 1:1 to about 20:1 parts of plasticizer to parts of antifoulant.

2. A modular antifouling tile system as in claim 1 wherein the antifoulant is 2,4,5,6-tetrachloroisophtalonitrile.

3. A modular antifoulant tile system as in claim 1 wherein the antifoulant is tributyltin fluoride.

4. A modular antifoulant tile system as in claims 1 wherein the antifoulant is tripropyltin oxide.

5. A modular antifoulant tile system as in claim 1 wherein the antifoulant is tripropyltin fluoride.

6. A modular antifoulant tile system as in claim 1 wherein the insitu antifoulant indicia and replenishment means is provided with a value means extending from the surface of the tile to the reservoirs for filling or emptying the reservoirs.

7. A modular antifoulant tile system as in claim 1 wherein the attachment means is a backing plate secured to the body portion of the elastomeric body for providing reinforcement therefor and for providing a means for securing the tile to the article for use in seawater.

8. A modular antifoulant tile system as in claim 1 wherein the elastomeric body portion is formed of two planar sections of material joined together along a common interface that interacts the reservoirs and consists of a circumferential strip of elastomeric material bonded to the planar sections for providing reinforcement therefor and for precluding separation of the planar sections along the common interface.

* * * * *